Jan. 22, 1963  J. W. ZIEGENFUSS  3,074,200
TRACK SYSTEM FOR TOY VEHICLES
Filed May 29, 1961  4 Sheets-Sheet 1

INVENTOR
Johann Wilhelm Ziegenfuss
By

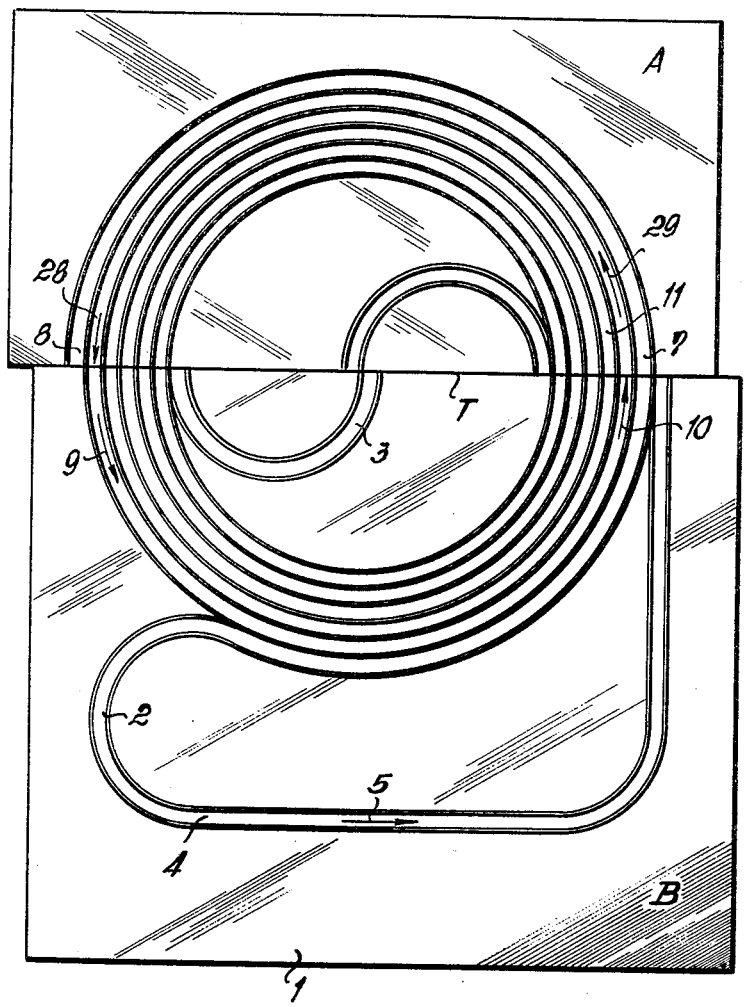

Jan. 22, 1963   J. W. ZIEGENFUSS   3,074,200
TRACK SYSTEM FOR TOY VEHICLES
Filed May 29, 1961   4 Sheets-Sheet 3

INVENTOR
Johann Wilhelm Ziegenfuss
By

Jan. 22, 1963   J. W. ZIEGENFUSS   3,074,200
TRACK SYSTEM FOR TOY VEHICLES
Filed May 29, 1961   4 Sheets-Sheet 4

INVENTOR
Johann Wilhelm Ziegenfuss
By

United States Patent Office 3,074,200
Patented Jan. 22, 1963

3,074,200
TRACK SYSTEM FOR TOY VEHICLES
Johann Wilhelm Ziegenfuss, Bonifatiusstrasse 89,
Dusseldorf-Lorick, Germany
Filed May 29, 1961, Ser. No. 113,415
Claims priority, application Germany May 28, 1960
3 Claims. (Cl. 46—1)

The present invention relates to an endless track system for toy vehicles movable on two rails or in two grooves while the track is mounted on a base plate and follows substantially a spiral and an outer reversing loop and an inner reversing loop, the arrangement being such that the vehicle may travel on such track either in one or the other direction.

Endless tracks of this general type are known and make it possible for a vehicle to travel in an uninterrupted manner. With this type of heretofore known arrangements, however, the track is fixedly connected to the base plate in such a way that the once established track is permanent. While in this way a relatively long track can be mounted on a relatively small base plate surface thereby furnishing a correspondingly long travelling time for the vehicle over the entire track, such an arrangement is rather limited as to variety of operating possibilities of the respective vehicle. As a matter of fact, the vehicle will travel in one direction only until it is lifted off the track and its direction reversed.

It is, therefore, an object of the present invention to provide a track system which while offering the advantages of the above mentioned heretofore known track systems will also make it possible greatly to vary the operating possibilities of the vehicle.

It is another object of this invention to provide a track system as set forth in the preceding paragraph, in which the vehicle may selectively travel along a spiral or a path following a different geometric curve or, without actually changing the connection of the track to the base plate, along tracks of for instance a circular path.

These and other objects and advantages of the invention will appear more clearly from the following specification in connection in connection with the accompanying drawings, in which:

FIG. 1 diagrammatically represents a top view of the track system according to the present invention.

FIG. 2 illustrates the track system of FIG. 1 with the two base plate sections displaced relative to each other.

Figure 1:
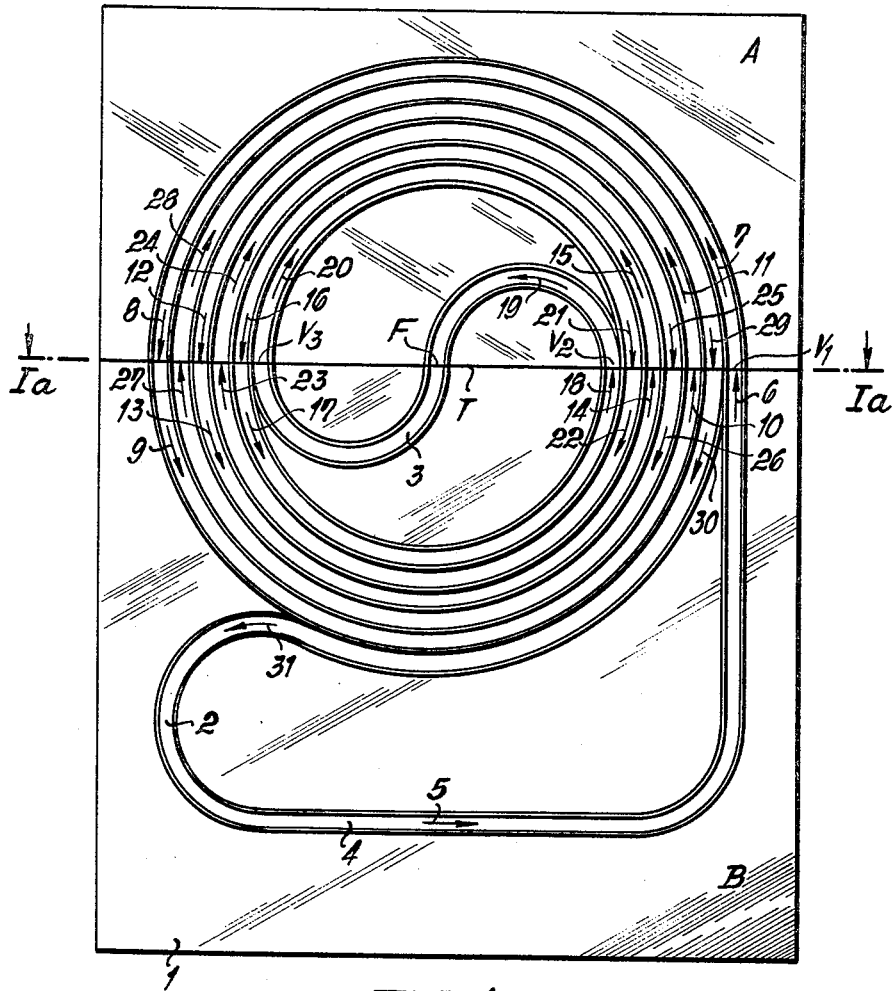
FIG. 1a is a section taken along the line Ia—Ia of FIG. 1.
Figure 3:
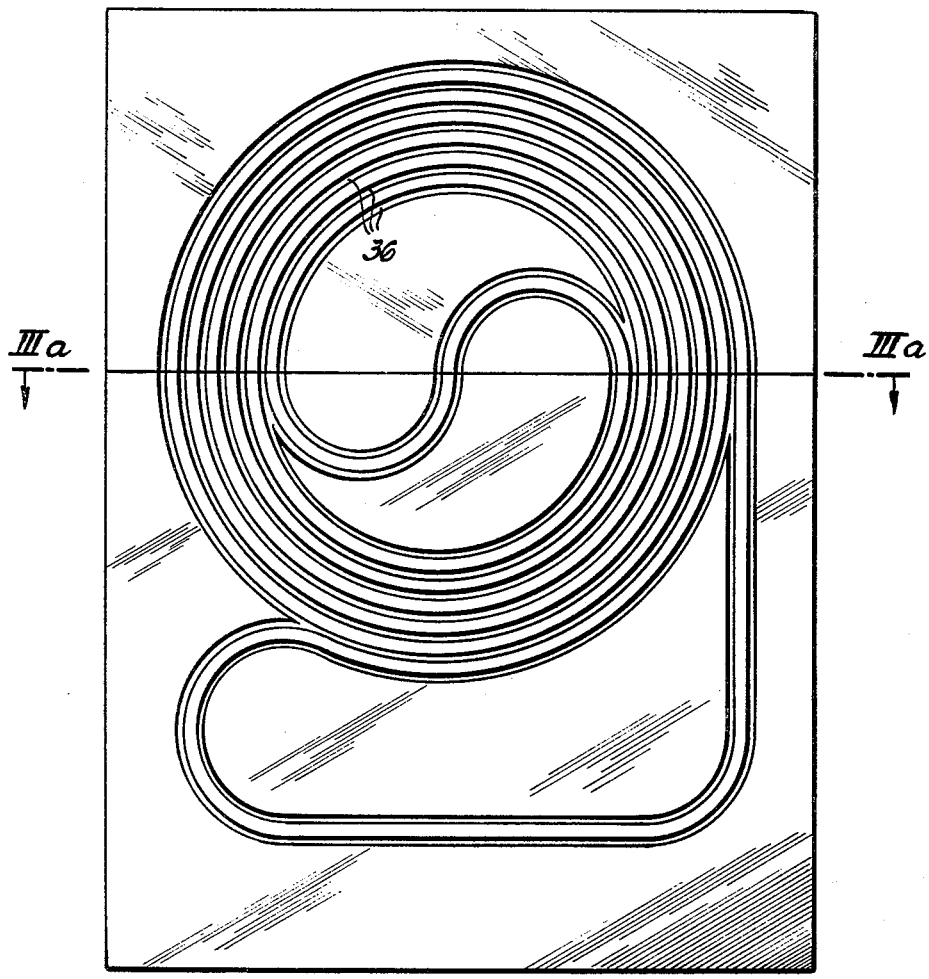

FIG. 3 diagrammatically illustrates a top view of a track system according to the present invention in which the rails shown in FIG. 1 have been replaced by grooves.

Figure 3A:

FIG. 3a is a section taken along the line IIIa—IIIa of FIG. 3.

Figure 4:
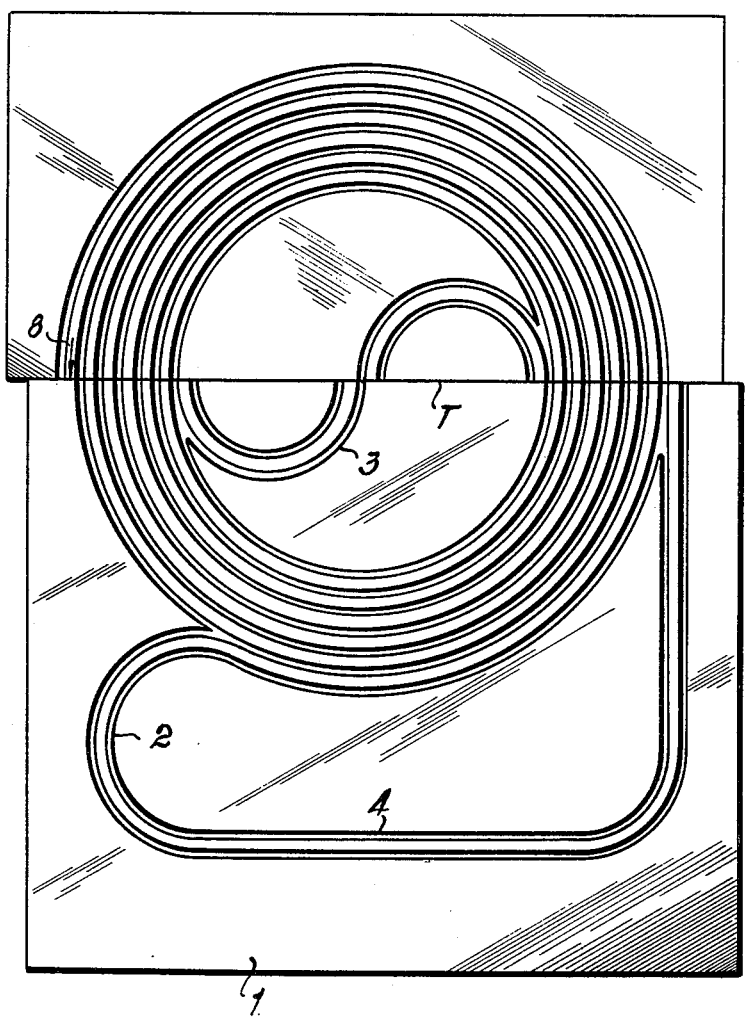

FIG. 4 shows the track system of FIG. 3 with the two base plate sections displaced relative to each other.

The track system according to the present invention is characterized in that the base plate on which the tracks are provided is subdivided along a line so as to form two sections which are displaceable relative to each other by the width of one or more tracks. According to a highly advantageous embodiment of the invention, the connecting point between the reversing loop and the two connecting points between the reversing track portion and the spiral track portion are located on a straight line which line coincides with the dividing line dividing the track system into two sections.

Due to the displaceability of the two track sections in conformity with the present invention, it is possible to cause the toy vehicle to pass through an endless track in the manner heretofore known while also permitting the vehicle to pass through several other different paths, for instance a circle. This change in the path of the vehicle may be effected while the vehicle is passing along the track. Due to this possibility of varying the path of the vehicle, the toy greatly increases its appeal and the interest of the child playing with this toy.

Referring now to FIGS. 1 and 2, the track illustrated therein consists of rails. More specifically, on base plate 1 there is mounted a two-rail track arranged substantially in form of a spiral and with an outer reversing loop 2 and with an inner S-shaped reversing track 3. The tracks located between the outermost and the innermost spiral-shaped tracks are being passed when driving in one as well as in the other direction. If, for instance, a toy vehicle starts at 4, which may be considered the start of the reversing loop 2, and moves in the direction of the arrow 5, the vehicle will travel along the track in the direction of the arrows 6-7-8-9-10-11-12-13-14-15-16-17-18 in counterclockwise direction following the various spirals whereupon in the inner S-shaped reversing track section 3 the direction of travel will be reversed so that the vehicle will now travel along the spiral track section in clockwise direction following the arrows 20-21-22-23-24-25-26-27-28-29-30. Thereupon the vehicle will reach the outer reversing loop 2 and again reverse its direction of travel following the arrow 5 as outlined above.

Similarly, the vehicle could also travel along the track in a direction opposite to the direction of the arrows from start to finish. In addition to these two possibilities there exists only the further possibility, when maintaining the FIG. 1 position of the base plate sections with regard to each other, to let two vehicles travel over the track at short distance from each other because when having two vehicles travel along the tracks in opposite direction, a collision will be unavoidable.

In conformity with the present invention the base plate 1 and consequently the tracks are subdivided by a line passing through a fixed point F of the spiral and the thus formed two parts are displaceable relative to each other by at least the width of a track. Preferably, the arrangement is such that the connecting point V1 between the reversing loop 2 and the spiral track portion as well as the two connecting points V2 and V3 between the reversing track portion 3 and the spiral track portion are arranged along a straight line which coincides with the dividing line T.

FIG. 2 illustrates a track system according to which the tracks have been displaced by a width of one track over the basic position which is shown in FIG. 1. By basic position is meant the position in which the two sections A and B of the base plate are so arranged that the track portion 6 is aligned with the track portion 7 while the track portion 8 is aligned with the track portion 9. When the sections A and B are displaceable relative to each other, it is possible first to move the sections A and B into their basic position as shown in FIG. 1 so that the vehicle may start its travel at 4 in the direction of the arrow 5 and pass through the track portions 7-8-9-10. When the vehicle has reached a position between the arrows 9 and 10, it is possible to displace the track sections A and B relative to each other by the width of one track as shown in FIG. 2 so that the vehicle after it has passed through the track portion 10 will enter the track portion 29 in contrast to the arrangement of FIG. 1 where the vehicle moves from track portion 10 into track portion 11. The vehicle will then move through track portion 28 into track portion 9 and from there to track portion 10 and again to track portions 29, etc. In other words, the vehicle will move along a closed circular path for any period of time for which the sections A and B maintain their relative position shown in FIG. 2.

If now either the section A or the section B is displaced so that the two sections again occupy their basic relative position, the vehicle will travel as described in connection with FIG. 1. However, it is, of course, also possible instead of displacing the sections A and B as shown in FIG. 2, to displace the sections A and B further by one more track width (to move sections A and B in leftward direction with regard to FIG. 2 by a further track width). In this instance the vehicle will again travel along a circular path but in this instance along a circular path of a smaller diameter. This operation, which makes it possible selectively to cause the vehicle to travel along the spiral path or along different circular paths according to the respective relative displacement of the sections A and B, allows a great variation not only with regard to the track being used but also with regard to the direction of travel. This makes the toy highly interesting and yields possibilities which are not obtainable with one rail tracks.

Figure 1A:

The embodiment of the invention as shown in FIGS. 1, 1a and 2 comprises rails 35 connected to the surface of the base plate 1. Similarly, the base plate 1 may also be provided with a track which is formed by grooves 36 in the base plate 1 as shown in FIGS. 3, 3a and 4. It is, however, evident that the same possibilities of operating the vehicle as they were described in connection with FIGS. 1, 1a and 2 also exist with the embodiments of FIGS. 3, 3a and 4. The grooves in the last mentioned three figures furthermore yield the possibility of employing vehicles with such wheels which have no rim or flange. In this way, for instance, a toy locomotive and a toy automobile may use the same grooved tracks if the track width of both vehicles or the gauge of the two vehicles corresponds to the track width or gauge of the track in the device according to the present invention.

It is, of course, to be understood that the present invention is, by no means, limited to the particular constructions shown in the drawings but also comprises any modifications within the scope of the appended claims. Thus, for instance, instead of arranging the tracks in form of a spiral, they may also have any other desired geometric basic form as for instance an ellipse, triangle, polygon, or the like as long as the base plate is divided into two sections which permit a relative displacement of the sections by the width of one or more tracks.

What I claim is:

1. In a track system for toy vehicles: an inner travel direction reversing track portion, an outer travel direction reversing track portion, and intermediate track portions located between and connectable to said inner and outer track portions, said inner and intermediate track portions being sub-divided into two units movable relative to each other selectively into a first position for interconnecting all of said track portions to form an endless track system, and into at least one other position for interconnecting selected intermediate track portions only to form an endless track system of only the respective interconnected intermediate track portions.

2. In a track system for toy vehicles: an inner travel direction reversing track portion, an outer travel direction reversing track portion, intermediate track portions having the tracks thereof arranged substantially along a spiral, a base plate carrying all of said track portions and having the same connected thereto, said base plate and said track portions being sub-divided into two groups along a substantially straight plane passing through a diameter of said spiral-shaped intermediate track portions, said groups being movable relative to each other selectively into a first position for interconnecting all of said track portions to form an endless track system, and into at least one other position for interconnecting selected intermediate track portions only to form an endless track system of only the respective interconnected intermediate track portions.

3. A track system according to claim 2, in which one of the connecting points of the outer travel direction reversing track portion with the intermediate spiral-shaped track portions, and also the two connecting points of the inner travel direction reversing track portion with said intermediate spiral-shaped track portions in said first position of said groups are located in said plane.

References Cited in the file of this patent

FOREIGN PATENTS

| | | |
|---|---|---|
| 640,364 | Germany | Dec. 31, 1936 |
| 467,788 | Great Britain | June 23, 1937 |